United States Patent
Hiramatsu et al.

(10) Patent No.: US 10,832,576 B2
(45) Date of Patent: Nov. 10, 2020

(54) DRIVING CONTROL METHOD AND DRIVING CONTROL APPARATUS

(71) Applicant: Nissan Motor Co., Ltd., Yokohama (JP)

(72) Inventors: Machiko Hiramatsu, Kanagawa (JP); Takashi Sunda, Kanagawa (JP); Hideaki Nemoto, Kanagawa (JP); Hwaseon Jang, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 81 days.

(21) Appl. No.: 16/304,498

(22) PCT Filed: May 27, 2016

(86) PCT No.: PCT/JP2016/065722
§ 371 (c)(1),
(2) Date: Nov. 26, 2018

(87) PCT Pub. No.: WO2017/203691
PCT Pub. Date: Nov. 30, 2017

(65) Prior Publication Data
US 2019/0295417 A1 Sep. 26, 2019

(51) Int. Cl.
| | |
|---|---|
| *G08G 1/16* | (2006.01) |
| *B60W 30/14* | (2006.01) |
| *B60W 30/16* | (2020.01) |
| *B60W 50/10* | (2012.01) |
| *B60W 50/14* | (2020.01) |

(Continued)

(52) U.S. Cl.
CPC ............... *G08G 1/16* (2013.01); *B60W 30/14* (2013.01); *B60W 30/143* (2013.01); *B60W 30/16* (2013.01); *B60W 50/10* (2013.01); *B60W 50/14* (2013.01); *G08G 1/09* (2013.01); *B60K 2310/244* (2013.01); *B60K 2310/264* (2013.01); *B60W 2050/0096* (2013.01); *B60W 2540/215* (2020.02); *B60W 2720/10* (2013.01); *B60W 2754/30* (2020.02)

(58) Field of Classification Search
CPC ................................. G08G 1/16; B60W 30/14
See application file for complete search history.

(56) References Cited

U.S. PATENT DOCUMENTS

| | | |
|---|---|---|
| 9,836,051 B2 | 12/2017 | Ishikawa et al. |
| 2016/0033964 A1 | 2/2016 | Sato et al. |
| 2016/0327947 A1 | 11/2016 | Ishikawa et al. |

(Continued)

FOREIGN PATENT DOCUMENTS

| | | |
|---|---|---|
| JP | H10329575 A | 12/1998 |
| JP | 2000306194 A | 11/2000 |

(Continued)

*Primary Examiner* — Anne Marie Antonucci
*Assistant Examiner* — Abdalla A Khaled
(74) *Attorney, Agent, or Firm* — Young Basile Hanlon & MacFarlane, P.C.

(57) ABSTRACT

When making a switch from automated driving to manual driving in a vehicle capable of switching between the manual driving and the automated driving, a driving control method of the present invention makes the switch to the manual driving after changing driving characteristics for the automated driving to switch driving characteristics suitable for the switch to the manual driving.

21 Claims, 7 Drawing Sheets

(51) Int. Cl.
*G08G 1/09* (2006.01)
*B60W 50/00* (2006.01)

(56) References Cited

U.S. PATENT DOCUMENTS

| | | | |
|---|---|---|---|
| 2018/0201275 A1* | 7/2018 | Tsuji | B60W 30/18 |
| 2019/0039618 A1* | 2/2019 | Mori | B60W 50/0098 |
| 2019/0072957 A1* | 3/2019 | Fujimura | G05D 1/0088 |
| 2019/0155279 A1* | 5/2019 | Tayama | B60W 50/14 |

FOREIGN PATENT DOCUMENTS

| | | |
|---|---|---|
| JP | 2011257234 A | 12/2011 |
| JP | 2013071524 A | 4/2013 |
| JP | 2015022423 A | 2/2015 |
| JP | 2015158469 A | 9/2015 |
| JP | 2015182525 A | 10/2015 |
| JP | 2016034782 A | 3/2016 |
| JP | 2016064773 A | 4/2016 |
| JP | 2016091412 A | 5/2016 |
| JP | WO2016051585 A1 | 4/2017 |
| WO | 2015115159 A1 | 8/2015 |
| WO | 2016051585 A1 | 4/2016 |

\* cited by examiner

DRIVING CONTROL METHOD AND DRIVING CONTROL APPARATUS

TECHNICAL FIELD

The present invention relates to a driving control method and apparatus that makes a switch between automated driving and manual driving in a vehicle switchable between manual driving and automated driving.

BACKGROUND

As a conventional navigation apparatus preset with timing to make a switch from automated driving to manual driving in an automated driving vehicle, Patent Literature 1 is disclosed. For a safe switch from automated driving to manual driving, the navigation apparatus disclosed in Japanese Patent Application Publication No. 2011-257234 provides "branching off ahead" guidance earlier during travelling under automated driving than during travelling under manual driving.

However, when making a switch from automated driving to manual driving, the conventional navigation apparatus described above makes the switch to manual driving while maintaining the driving characteristics for automated driving. Thus, the driver needs to take over the driving characteristics for automated driving even after a shift to manual driving, and is therefore unable to start manual driving feeling secure.

SUMMARY

Thus, the present invention has been proposed in view of the above circumstances, and aims to provide a driving control method and apparatus that allows a driver to start manual driving feeling secure upon a shift from automated driving to manual driving.

To solve the above problem, when making a switch from automated driving to manual driving, a driving control method and apparatus according to an aspect of the present invention makes the switch to manual driving after changing driving characteristics for automated driving to switch driving characteristics suitable for the switch to manual driving.

The present invention enables the driver to start manual driving feeling secure when a switch is made from automated driving to manual driving.

DETAILED DESCRIPTION

First Embodiment

A first embodiment to which the present invention is applied is described below with reference to some drawings.

Configuration of the Driving Control System

Figure 1:
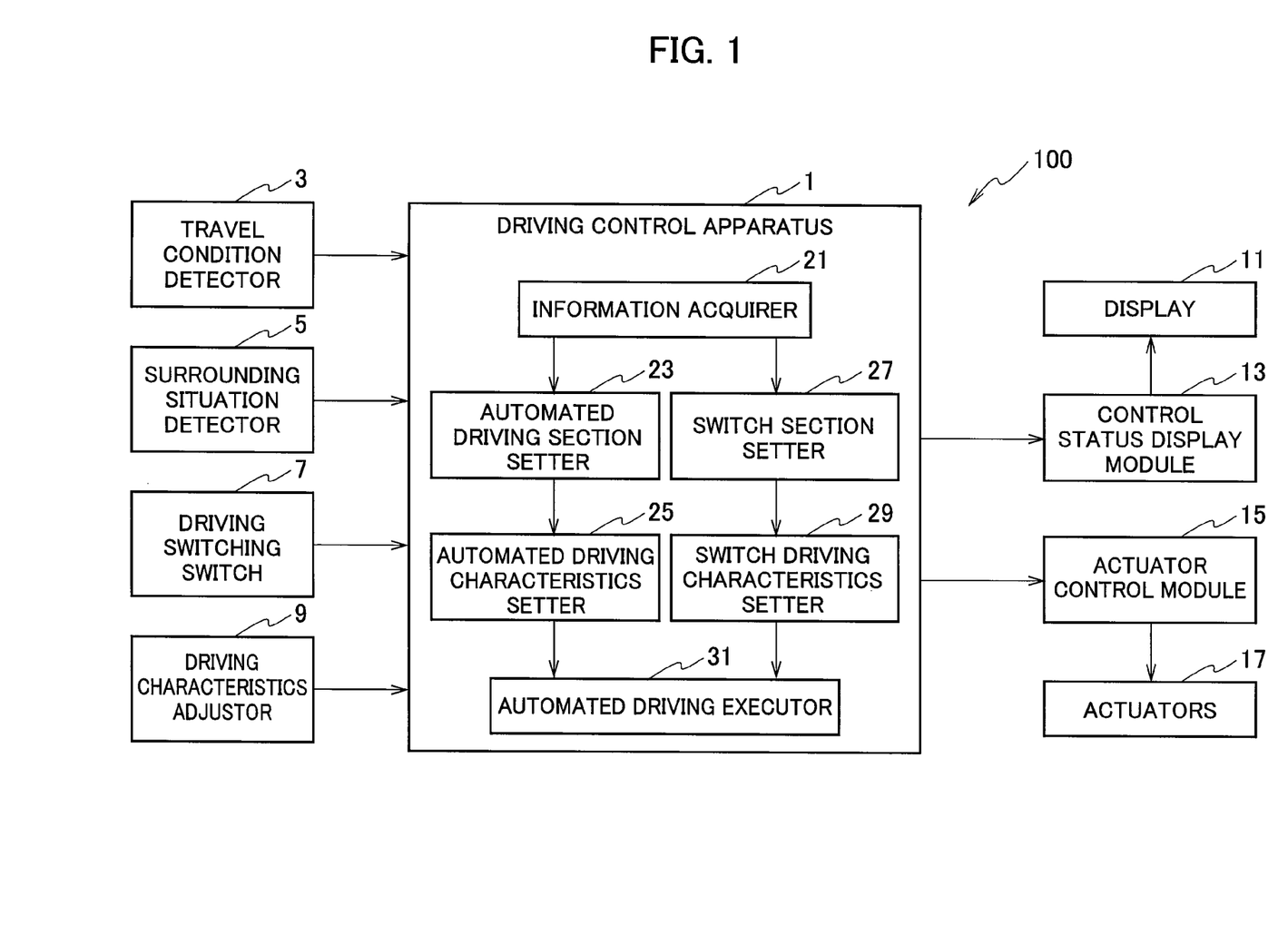
FIG. 1 is a block diagram illustrating the configuration of a driving control system including a driving control apparatus according to a first embodiment of the present invention.
Figure 2:
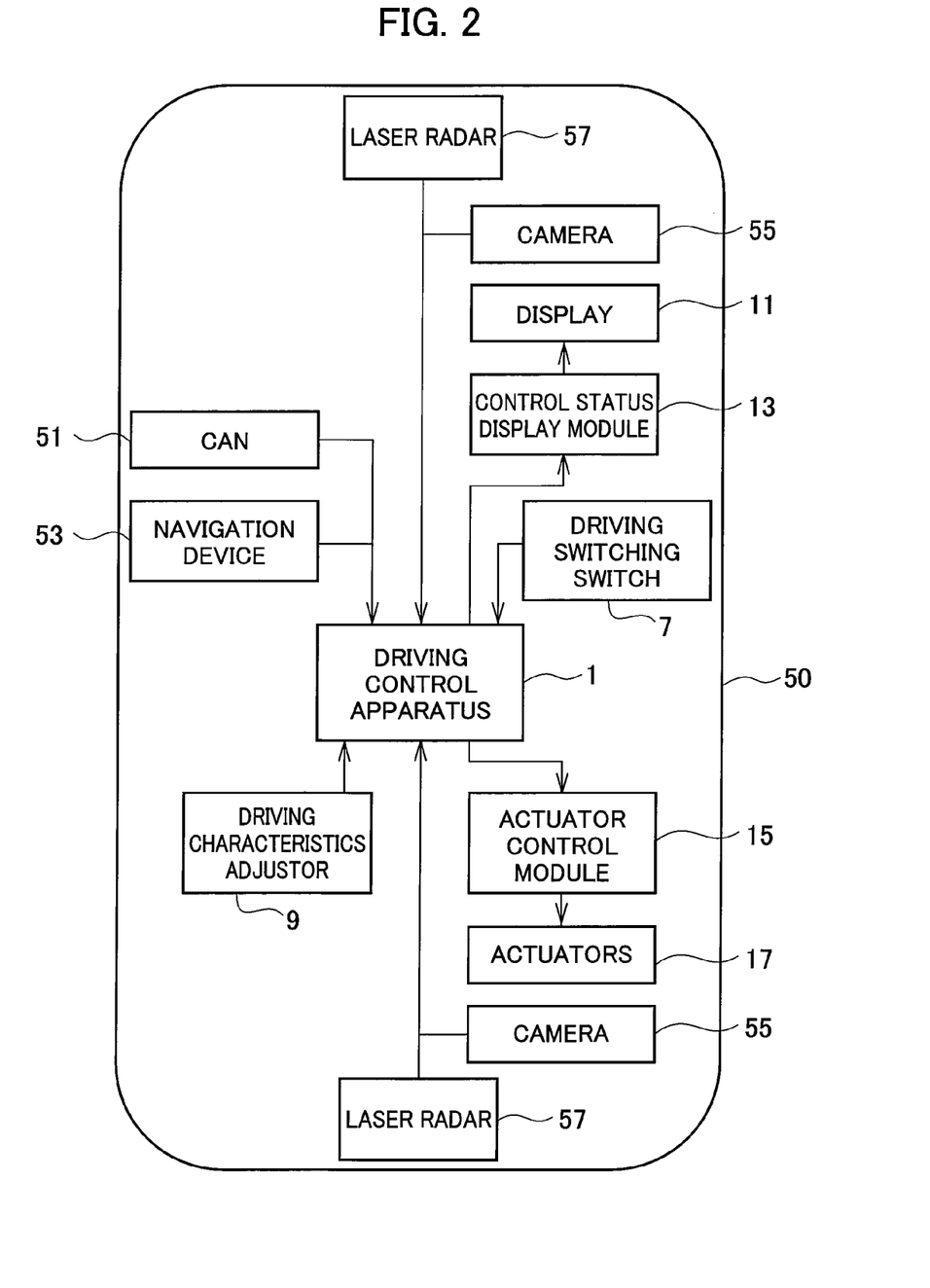
FIG. 2 is a block diagram illustrating a specific hardware configuration of the driving control system including the driving control apparatus according to the first embodiment of the present invention.
Figure 3:
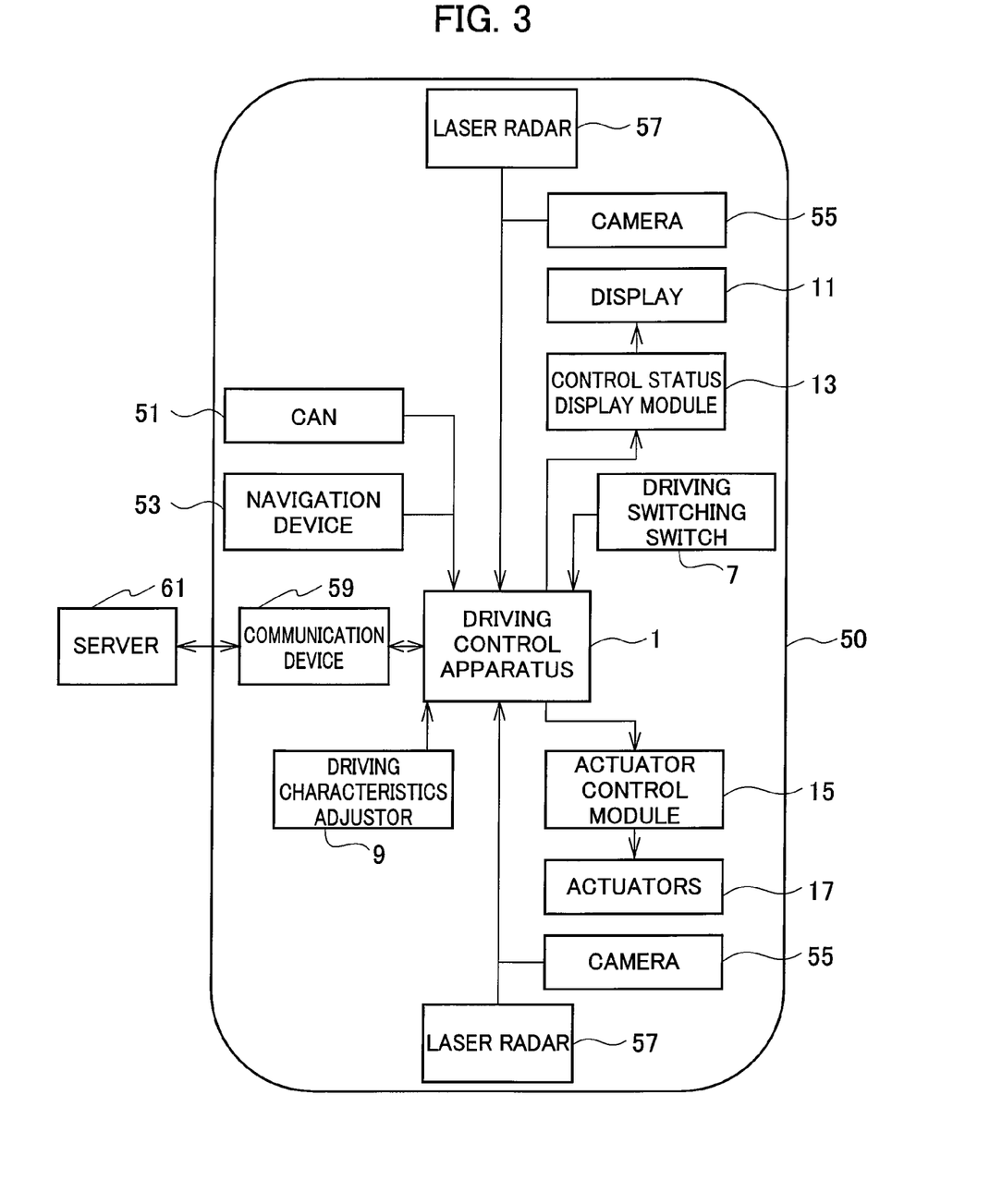
FIG. 3 is a block diagram illustrating a specific hardware configuration of the driving control system including the driving control apparatus according to the first embodiment of the present invention.

FIG. 1 is a block diagram illustrating the configuration of a driving control system including a driving control apparatus according to the present embodiment. In addition, FIGS. 2 and 3 are each a block diagram illustrating a specific hardware configuration of the driving control system including the driving control apparatus according to the present embodiment. As illustrated in FIG. 1, a driving control system 100 according to the present embodiment includes a driving control apparatus 1, a travel condition detector 3, a surrounding situation detector 5, a driving switching switch 7, a driving characteristics adjuster 9, and a display 11. Further, the driving control system 100 is connected to a control status display module 13, an actuator control module 15, and actuators 17, which are installed in the vehicle.

The driving control apparatus 1 is a controller that performs driving switch processing to make a switch between automated driving and manual driving in a vehicle switchable between manual driving in which the vehicle is caused to travel by driving operations performed by an occupant and automated driving in which the vehicle is caused to travel without driving operations performed by the occupant. In particular, when making a switch from automated driving to manual driving, the driving control apparatus 1 changes driving characteristics for automated driving to switch driving characteristics for switching suitable for a switch to manual driving, and then makes the switch to manual driving. Here, the driving control apparatus 1 includes an information acquirer 21, an automated driving section setter 23, an automated driving characteristics setter 25, a switch section setter 27, a switch driving characteristics setter 29, and an automated driving executor 31, and is installed in a vehicle 50 as illustrated in FIG. 2. Additionally, as illustrated in FIG. 3, a communication device 59 may be installed in the vehicle 50 to accumulate data in a server 61. Further, the driving control apparatus 1 may be installed in the server 61. Herein, manual driving is a mode in which a vehicle is caused to travel by driving operations performed by an occupant, and automated driving is a mode in which a vehicle is caused to travel without driving operations performed by an occupant. Driving characteristics for automated driving may be amounts of driving operations (such as amounts of acceleration or amounts of steering angle). Further, driving characteristics for automated driving may use the behaviors of the vehicle (such as a vehicle speed, an acceleration, and a yaw rate) directly as the driving characteristics for an occupant. Further, manual driving does not necessarily mean that an occupant is performing driving operations using all the operation parts that the occupant operates to drive the vehicle (e.g., the accelerator, the brake, the steering wheel, a constant vehicle speed setting operation part, a windshield wiper operation part, and a headlamp operation part). When a driving operation is being performed on part of the operation parts that an occupant performs to drive the vehicle, an operation part under the driving operation is being manually driven, and an operation part not under the driving operation is being automatically driven. In this way, the status for each operation part may be set to either manual driving or automated driving.

The above-mentioned switch driving characteristics are characteristics that are applied before starting manual driving in a switch from automated driving to manual driving so that an occupant can start manual driving feeling secure. In starting of manual driving, there may be times when it is difficult to start manual driving while keeping the driving characteristics for automated driving, such as when the vehicle is travelling at a high speed or when the inter-vehicular distance is short. Even in such cases, the application of the switch driving characteristics makes it easier to start manual driving. Further, some occupants may feel uneasy about starting manual driving while keeping driving characteristics for automated driving. In this regard, the application of the switch driving characteristics gives an allowance in the travelling situation, enabling the occupant to start manual driving with composure and to feel less insecure about starting manual driving. In particular, the more complicated the travelling situation is, the more uneasy an occupant may feel, and the application of the switch driving characteristics can make the occupant less uneasy even in a complicated travelling scene. In addition, by feeling less uneasy about starting manual driving, an occupant can start manual driving with assurance, which ensures a switch from automated driving to manual driving. Further, an occupant may be or may not be good at driving, and especially when the occupant is not good at driving, it may be hard for the occupant to start manual driving while keeping the driving characteristics for automated driving. In this regard, the present embodiment applies switch driving characteristics and thereby enables a switch from automated driving to manual driving irrespective of whether the occupant is or is not good at driving.

The travel condition detector 3 detects data indicative of the travel condition of the vehicle 50, such as a speed, a steering angle, and an acceleration, and is, for example, an in-vehicle network like a CAN (Controller Area Network) 51, or a navigation apparatus 53.

The surrounding situation detector 5 detects data indicative of the surrounding situation of the vehicle 50 such as the inter-vehicular distance to a preceding vehicle, the position of a parked vehicle, and a distance to an intersection, and is, for example, a camera 55 and a laser radar 57 installed in the vehicle and the navigation apparatus 53. In addition, the surrounding situation may be detected using a sonar, vehicle-to-vehicle communications, and vehicle-to-infrastructure communications.

The driving switching switch 7 is a switch that is installed in a vehicle and makes a switch between automated driving and manual driving as operated by an occupant of the vehicle. The driving characteristics adjustor 9 is a switch that is installed in the vehicle and receives inputs from an occupant of the vehicle to make adjustments on the driving characteristics for automated driving. For example, the driving characteristics adjustor 9 receives, from an occupant of the vehicle, an input to adjust the vehicle speed and inter-vehicular distance used during automated driving.

The display 11 displays the control status of driving switch processing performed by the driving control apparatus 1. For example, the display 11 presents to the driver driving characteristics during automated driving, such as a vehicle speed and an inter-vehicular distance. The display 11 may be the display screen of the navigation apparatus 53 or a head-up display. The control status display module 13 detects the control status while automated driving is being performed from the driving control apparatus 1, and performs processing to display the control status on the display 11.

The actuator control module 15 acquires an automated driving control output from the driving control apparatus 1, and performs processing to drive various actuators 17 installed in the vehicle. The actuators 17 are driving means installed to drive parts of the vehicle 50 such as the accelerator, the brake, and the steering wheel.

Next, a description is given of the parts forming the driving control apparatus 1. The information acquirer 21 acquires data on the travel condition of the vehicle 50 detected by the travel condition detector 3 and data on the surrounding situation of the vehicle 50 detected by the surrounding situation detector 5. Specifically, the information acquirer 21 acquires data such as a speed, a steering angle, and an acceleration as the travel conditions of the vehicle 50, and acquires data such as an inter-vehicular distance to a preceding vehicle, the position of a parked vehicle, and a distance to an intersection as the surrounding situations of the vehicle 50.

When an occupant of the vehicle inputs a destination and a travel route is set, the automated driving section setter 23 detects, on the set travel route, a section where automated driving can be performed and sets the section as an automated driving section. Examples of automated driving sections include an arterial road, an expressway, a road with one lane or more in one direction, and a road where automated driving has been performed before.

The automated driving characteristics setter 25 sets driving characteristics used during automated driving. For example, the automated driving characteristics setter 25 sets, for example, a speed, an inter-vehicular distance, an acceleration, the position of the vehicle inside a lane, and the like used during automated driving. Further, if an occupant of the vehicle adjusts driving characteristics using the driving characteristics adjustor 9, the automated driving characteristics setter 25 changes the driving characteristics based on the adjustment.

The switch section setter 27 sets a switch section where the driving characteristics for automated driving are changed to switch driving characteristics. Specifically, when an occupant of the vehicle inputs a destination and a travel route is set, the switch section setter 27 detects a switch point on the set travel route where an automated driving section ends and a switch to manual driving is made. Then, the switch section setter 27 sets a section a predetermined distance or a predetermined period of time before the switch point as a switch section. In particular, the switch section is preferably set to a section on the travel route of the vehicle which is suitable for a switch from automated driving to manual driving and is safe for the vehicle to travel.

The switch driving characteristics setter 29 sets switch driving characteristics used during a switch from automated driving to manual driving. Switch driving characteristics are driving characteristics suitable for a switch from automated driving to manual driving. Specifically, in the switch driving characteristics, the vehicle speed of the vehicle is set to be lower than that during automated driving. Further, in the switch driving characteristics, a distance from the vehicle to an ambient object is set to be longer than that set for automated driving. Further, if an occupant of the vehicle adjusts driving characteristics during automated driving, the switch driving characteristics setter 29 may set switch driving characteristics according to the adjustment on the driving characteristics.

The automated driving executor 31 executes automated driving when the vehicle enters an automated driving section or when an occupant of the vehicle selects automated driving. Specifically, the automated driving executor 31 executes the automated driving using the driving characteristics set by the automated driving characteristics setter 25. In the execution of automated driving, the automated driving executor 31 first determines, based on the surrounding situation recognized by the surrounding situation detector 5, the vehicle behaves during travelling on the travel route set as a result of an occupant of the vehicle inputting a destination. The automated driving executor 31 controls the vehicle based on the behavior of the vehicle determined. In other words, automated driving is executed when a destination is set, a route is generated, a behavior is determined based on surrounding recognition results, and the vehicle is controlled based on the determined behavior. When a switch is made from automated driving to manual driving, the automated driving executor 31 executes automated driving using the switch driving characteristics set by the switch driving characteristics setter 29. Particularly in a switch section set by the switch section setter 27, the automated driving executor 31 executes automated driving using switch driving characteristics. Further, the automated driving executor 31 may perform control that prohibits adjustment made on the driving characteristics for automated driving by the occupant of the vehicle for a predetermined period of time before the switch section starts. Further, a switch requirement to permit a switch from automated driving to manual driving is preset, and the automated driving executor 31 makes a switch to manual driving when this switch requirement is satisfied.

Note that the driving control apparatus 1 is configured with a general-purpose electric circuit including a microcomputer, a microprocessor, or a CPU and a peripheral device such as memory. Then, the driving control apparatus 1 executes particular programs to operate as the information acquirer 21, the automated driving section setter 23, the automated driving characteristics setter 25, the switch section setter 27, the switch driving characteristics setter 29, and the automated driving executor 31 described above. Such functions of the driving control apparatus 1 can be implemented by one or a plurality of processing circuits. A processing circuit includes a programmed processing device such as a processing device including an electric circuit for example, and also includes a device such as an application-specific integrated circuit (ASIC) adapted to execute the functions described in the embodiment or a conventional circuit component.

Procedure of Driving Switch Processing

Figure 4:
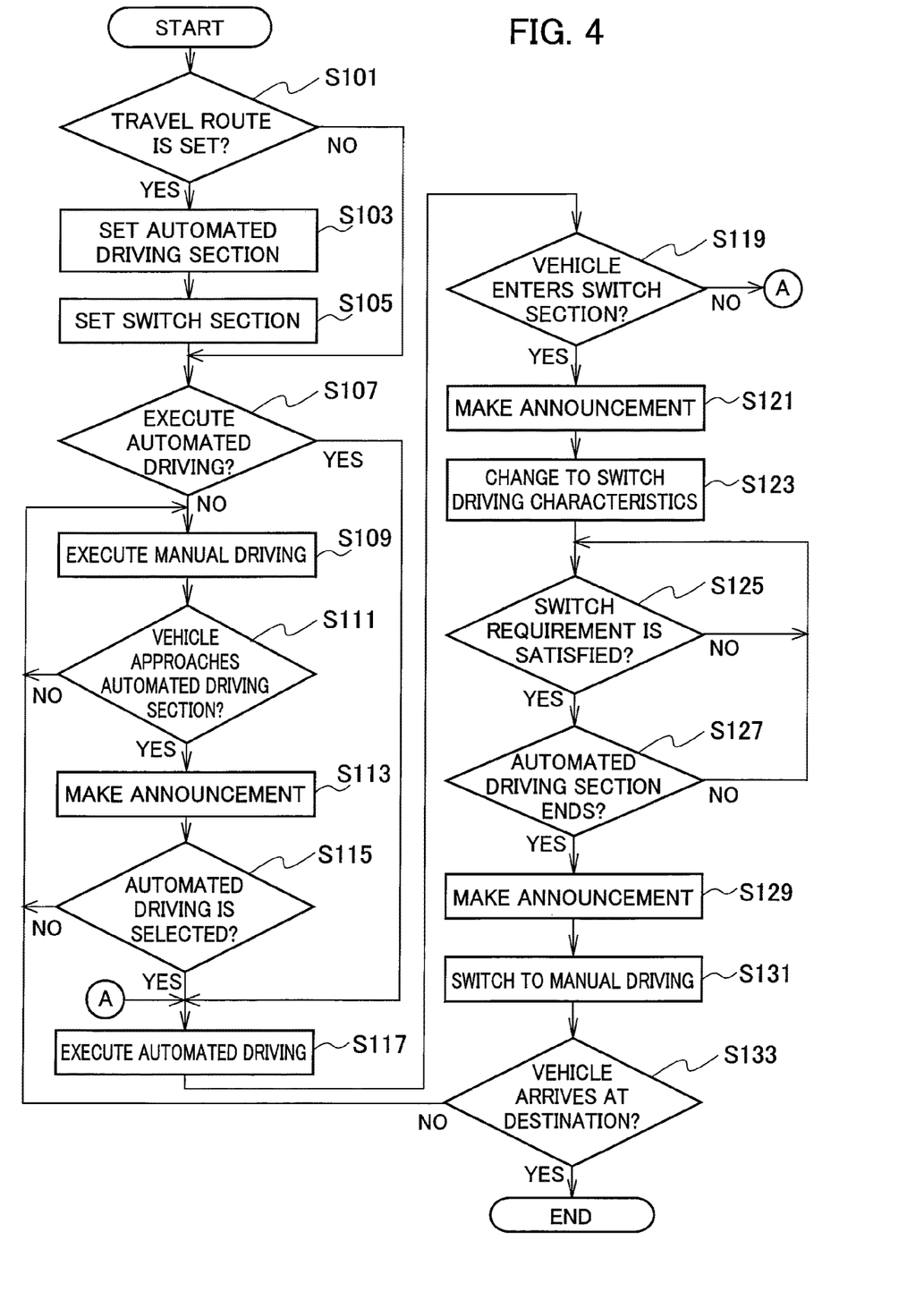
FIG. 4 is a flowchart illustrating a processing procedure of driving switch processing performed by the driving control apparatus according to the first embodiment of the present invention.
Figure 5:
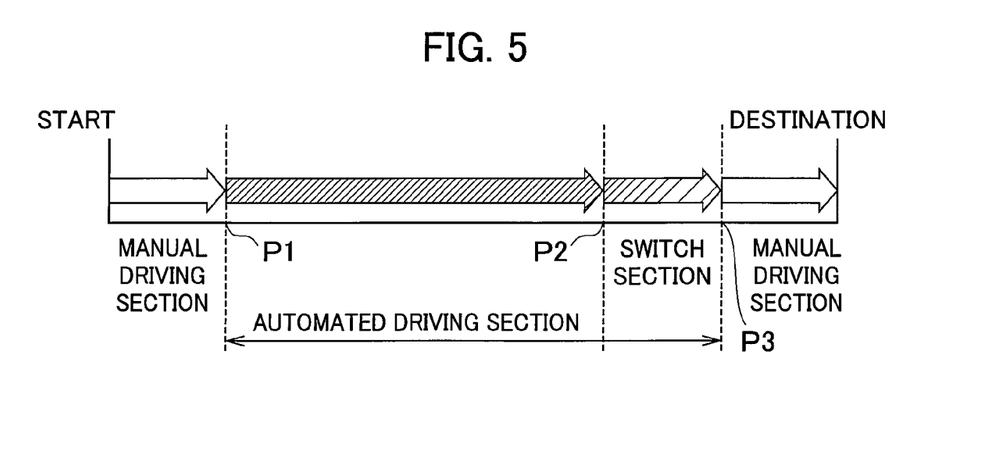
FIG. 5 is a diagram illustrating a switch between driving sections while a vehicle travels to a destination.

Next, a procedure of driving switch processing by the driving control apparatus 1 according to the present embodiment is described with reference to the flowchart in FIG. 4 and to FIG. 5. The driving switch processing illustrated in FIG. 4 is initiated when the ignition of the vehicle is turned on. FIG. 5 is a diagram illustrating how a switch is made between driving sections when the vehicle is travelling to a destination.

As illustrated in FIG. 4, first in Step S101, the information acquirer 21 acquires information from the navigation apparatus 53 and determines whether a travel route has been set as a result of an occupant of the vehicle inputting a destination. The processing proceeds to Step S103 when a travel route has been set, or to Step S107 when a travel route has not been set.

In Step S103, the automated driving section setter 23 detects, on the set travel route, a section where automated driving can be performed, and sets the section as an automated driving section. In FIG. 5 for example, a section from P1 to P3 is set as an automated driving section. An automated driving section is set based on a destination set by the driver and map information, and is, for example, an arterial road, an expressway, a road with one lane or more in one direction, and a road where automated driving has been performed before.

In Step S105, the switch section setter 27 detects the switch point P3 where the automated driving section set in Step S103 ends and a switch to manual driving is made, and sets a section a predetermined distance or a predetermined period of time before the switch point P3 as a switch section. For instance, a switch section is set to a section which starts 1 km, 30 seconds, or the like before the switch point P3 and lasts until the switch point P3, and in FIG. 5, is set to a section from P2 to P3.

Further, the switch section is set to a section suitable for a switch to manual driving based on the set destination and map information. Examples of a switch section include a place with no intersection nearby, a place with no mergence point or branch point nearby, a place with no point where the lane width or the number of lanes decreases nearby, a place with no point of change in speed limit nearby, and a place with no curving. In other words, a switch section is set to a section where the vehicle can travel safely. Further, a switch section is set under similar conditions even when it is determined that a switch to manual driving is necessary earlier than scheduled due to a change in the road situation while the vehicle is travelling under automated driving.

In Step S107, the automated driving executor 31 determines whether to execute automated driving. The automated driving executor 31 determines to execute automated driving and proceeds to Step S117 if the vehicle is already in an automated driving section or if an occupant of the vehicle operates the driving switching switch 7 to select automated driving. Otherwise, the automated driving executor 31 determines to execute manual driving and proceeds to Step S109.

In Step S109, the automated driving executor 31 does not execute automated driving and sets manual driving. Thereby, the vehicle is started to travel by manual driving performed by the driver of the vehicle.

In Step S111, the automated driving executor 31 determines whether the vehicle has travelled and approached the automated driving section. The automated driving executor 31 proceeds back to Step S109 and continues manual driving if the vehicle has not approached the automated driving section, or proceeds to Step S113 if the vehicle has approached the automated driving section.

In Step S113, the automated driving executor 31 makes an announcement informing an occupant of the vehicle that the automated driving section is approaching. For example, the automated driving executor 31 makes an announcement "You are in an automated driving section. Do you want to switch to automated driving?" to prompt the driver to switch to automated driving.

In Step S115, the automated driving executor 31 determines whether the driver has operated the driving switching switch 7 to select automated driving. The automated driving executor 31 proceeds to Step S117 if automated driving is selected by the driver, or proceeds back to Step S109 and continues manual driving if automated driving is not selected.

In Step S117, the automated driving executor 31 executes automated driving. Specifically, the automated driving executor 31 executes automated driving using driving characteristics set by the automated driving characteristics setter 25.

In Step S119, the automated driving executor 31 determines whether the vehicle has traveled, approached the switch point P3 where automated driving is switched to manual driving, and entered the switch section. In other words, the automated driving executor 31 determines whether the vehicle has passed P2 in FIG. 5. Then, the automated driving executor 31 proceeds back to Step S117 and continues automated driving if the vehicle has not entered the switch section, or proceeds to Step S121 if the vehicle has entered the switch section.

In Step S121, the automated driving executor 31 makes an announcement informing the occupant of the vehicle that the automated driving section is ending shortly. For example, the automated driving executor 31 makes an announcement, "Automated driving is ending in 1 km," to inform the driver that automated driving will end and be switched to manual driving. In this event, the automated driving executor 31 may control such that, before changing the driving characteristics to switch driving characteristics, the automated driving executor 31 confirms with the occupant of the vehicle whether to permit changing the driving characteristics, and changes the driving characteristics to switch driving characteristics if the changing the driving characteristics is permitted.

Figure 6:
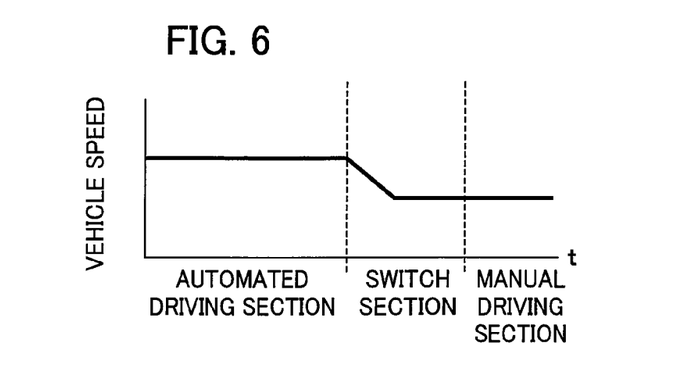
FIG. 6 is a diagram illustrating control to decrease a vehicle speed as switch driving characteristics.
Figure 7:
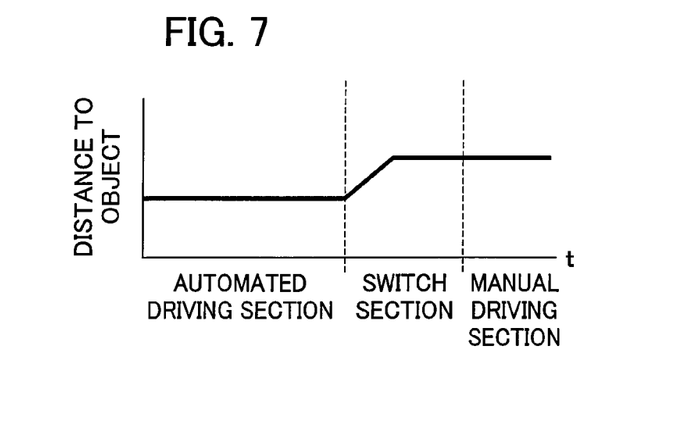
FIG. 7 is a diagram illustrating control to increase a distance to an object as switch driving characteristics.

In Step S123, the automated driving executor 31 changes the driving characteristics for automated driving to switch driving characteristics set by the switch driving characteristics setter 29. The switch driving characteristics are driving characteristics for switching suitable for a switch from automated driving to manual driving. Specifically, in switch driving characteristics, the vehicle speed of the vehicle is set to be lower than that during automated driving, as illustrated in FIG. 6. To this end, the vehicle speed of the vehicle may be set to be lower than that during automated driving by a predetermined value or more, or may be reduced by a deceleration of a predetermined value or above. Also, in switch driving characteristics, the distance from the vehicle to an ambient object is changed to be longer than that set during automated driving, as illustrated in FIG. 7. To this end, the distance from the vehicle to an ambient object may be set to be longer than that set during automated driving by a predetermined value or above, or may be increased at a change rate of a predetermined value or more. As an object, a preceding vehicle, a parked vehicle, a different travelling vehicle, a pedestrian, a building, or the like is set.

Further, when driving characteristics have been adjusted by the occupant of the vehicle during automated driving, the switch driving characteristics setter 29 may set switch driving characteristics according to the adjustment made on the driving characteristics. For instance, if the occupant adjusts and increases the vehicle speed of the vehicle during automated driving, the switch driving characteristics setter 29 may set switch driving characteristics so that the vehicle speed may be the pre-adjustment vehicle speed or be increased. Further, if the occupant adjusts and decreases the vehicle speed of the vehicle during automated driving, the switch driving characteristics setter 29 may set switch driving characteristics so that the vehicle speed may stay at the post-adjustment vehicle speed or be decreased. Further, if the occupant adjusts and decreases the inter-vehicular distance to a preceding vehicle during automated driving, the switch driving characteristics setter 29 may set switch driving characteristics so that the inter-vehicular distance may be the pre-adjustment inter-vehicular distance or be decreased. Further, if the occupant adjusts and increases the inter-vehicular distance to a preceding vehicle during automated driving, the switch driving characteristics setter 29 may set switch driving characteristics so that the inter-vehicular distance may stay at the post-adjustment inter-vehicular distance or be increased.

Further, the switch driving characteristics setter 29 may adjust switch driving characteristics according to at least one of the attribute of an occupant of the vehicle and a loading situation of the vehicle. For example, the switch driving characteristics setter 29 may set the vehicle speed even lower or the distance to an ambient object even longer when an occupant of the vehicle is an elderly person or a child or when the vehicle is carrying a heavy load. The attribute of an occupant may be identified using an in-vehicle sensor, such as a camera, or may be identified based on ID information in a security switch used when the occupant gets on the vehicle. Alternatively, the attribute of an occupant may be selected by the occupant. Identification of whether the vehicle is carrying any load or whether the vehicle is carrying a heavy load may be done by a sensor provided in a carriage space or by a selection or instruction received from the driver.

In Step S125, the automated driving executor 31 determines whether a switch requirement for permitting a switch from automated driving to manual driving is satisfied. A switch requirement is a condition to be satisfied by the travel condition or the surrounding environment of the vehicle for a safe switch from automated driving to manual driving. For example, the switch requirement is at least one of the following requirements where: the vehicle travels straight, the steering angle of the vehicle is a predetermined value or below, the vehicle travels at a constant speed, and the acceleration or deceleration of the vehicle is a predetermined value or below. This ensures safety of the vehicle and allows the driver to start manual driving feeling secure. Further, the switch requirement may also be at least one of the following requirements: no travelling or parked vehicle is located within a predetermined range from the vehicle and the distance from the vehicle to an intersection, a curve, a mergence point, a branch point, a point where the number of lanes decreases, a point where the lane width decreases, or a point where the speed limit changes is a predetermined value or above. This makes it possible to prevent acceleration, deceleration, a braking operation, or a steering operation from having to be performed immediately after a switch to manual driving is made and therefore allows the driver to start manual driving feeling secure.

In this regard, the switch driving characteristics setter 29 may adjust the switch driving characteristics to make them satisfy the switch requirement. For example, the switch driving characteristics setter 29 adjusts the travel conditions of the vehicle such as the vehicle speed and the inter-vehicular distance by adjusting the amount of decrease in the vehicle speed or by making the vehicle travel on the far left lane. Further, the automated driving executor 31 may adjust the timing for a switch so that the driver can take over and perform manual driving with the switch requirement being satisfied. Further, if the switch requirement is not satisfied, the automated driving executor 31 may perform control such that a switch to manual driving is made when the travel conditions of the vehicle do not change for a predetermined period of time. Then, when the switch requirement is not satisfied, the automated driving executor 31 continues to make the determination about the switch requirement, or proceeds to Step S127 when the switch requirement is satisfied.

In Step S127, the automated driving executor 31 determines whether the vehicle has arrived at the switch point P3 and the automated driving section has ended. The automated driving executor 31 proceeds back to Step S125 and continues the determination about the switch requirement and the determination about the end of the automated driving section if the automated driving section has not ended, or proceeds to Step S129 if the automated driving section has ended.

In Step S129, the automated driving executor 31 makes an announcement informing the occupant of the vehicle that automated driving is ending. For example, the automated driving executor 31 makes an announcement, "Automated driving is ending. Please start manual driving," to inform the driver that automated driving ends and manual driving starts.

In Step S131, the automated driving executor 31 ends automated driving and makes a switch to manual driving.

In Step S133, the automated driving executor 31 determines whether the vehicle has arrived at the destination. The automated driving executor 31 proceeds back to Step S109 and continues manual driving if the vehicle has not arrived at the destination, and ends the driving switch processing according to the present embodiment if the vehicle has arrived at the destination.

Advantageous Effects of the First Embodiment

As described above in detail, when making a switch from automated driving to manual driving, the driving control method and apparatus according to the present embodiment changes driving characteristics for automated driving to switch driving characteristics for switching suitable for a switch to manual driving, and then makes the switch to manual driving. This allows the driver to start manual driving feeling secure even after the switch from automated driving to manual driving.

Further, the driving control method and apparatus according to the present embodiment sets the vehicle speed of the vehicle in switch driving characteristics to be lower than that during automated driving. This enables the switch to manual driving to be made with safety of the vehicle being enhanced, and therefore allows the driver to start manual driving more feeling secure.

Further, the driving control method and apparatus according to the present embodiment sets the vehicle speed of the vehicle in switch driving characteristics to be lower than that during automated driving by a predetermined value or more or by a deceleration of a predetermined value or above. This allows the driver to feel a decrease in the vehicle speed and thus to start manual driving more feeling secure.

Further, the driving control method and apparatus according to the present embodiment sets a distance from the vehicle to an ambient object in switch driving characteristics to be longer than that set during automated driving. This enables a switch to manual driving to be made with safety of the vehicle being enhanced, and therefore allows the driver to start manual driving more feeling secure.

Further, the driving control method and apparatus according to the present embodiment sets a distance from the vehicle to an ambient object in switch driving characteristics to be longer than that set during automated driving by a predetermined value or more or increases a distance from the vehicle to an ambient object at a change rate of a predetermined value or above. This allows the driver to feel an increase in the distance from the vehicle to an ambient object and thus to start manual driving more feeling secure.

Further, the driving control method and apparatus according to the present embodiment sets, on a travel route of the vehicle, a switch section where driving characteristics for automated driving are changed to switch driving characteristics. This ensures that driving characteristics for automated driving are changed to switch driving characteristics and enables a safe switch to manual driving.

Further, the driving control method and apparatus according to the present embodiment sets the switch section to a section suitable for a switch from automated driving to manual driving. This enables a safe switch from automated driving to manual driving.

Further, the driving control method and apparatus according to the present embodiment prohibits adjustment made on the driving characteristics for automated driving by an occupant of the vehicle for a predetermined period of time before the switch section starts. This can prevent driving characteristics from being changed immediately before a switch to manual driving is made and therefore allows the driver to start manual driving feeling secure.

Further, if an occupant of the vehicle adjusts driving characteristics during automated driving, the driving control method and apparatus according to the present embodiment sets switch driving characteristics according to the adjustment made on the driving characteristics. This enables the intention of the driver during automated driving to be considered and reflected in the switch driving characteristics.

Further, if an occupant of the vehicle adjusts and increases the vehicle speed of the vehicle during automated driving, the driving control method and apparatus according to the present embodiment increases the vehicle speed in the switch driving characteristics. This enables the switch driving characteristics to be set with the intension of the driver being reflected therein. Note that, if an occupant of the vehicle adjusts and increases the vehicle speed of the vehicle during automated driving, the driving control method and apparatus according to the present embodiment may set the pre-adjustment vehicle speed as the vehicle speed in the switch driving characteristics. This enables a safe switch from automated driving to manual driving.

Further, if an occupant of the vehicle adjusts and decreases the vehicle speed of the vehicle during automated driving, the driving control method and apparatus according to the present embodiment decreases the vehicle speed in the switch driving characteristics. This enables the switch driving characteristics to be set with the intension of the driver being reflected therein. Note that, if an occupant of the vehicle adjusts and decreases the vehicle speed of the vehicle during automated driving, the driving control method and apparatus according to the present embodiment may set the post-adjustment vehicle speed as the vehicle speed in the switch driving characteristics. This enables the switch driving characteristics to be set with the intension of the driver being reflected therein.

Further, if an occupant of the vehicle adjusts and decreases the inter-vehicular distance to a preceding vehicle during automated driving, the driving control method and apparatus according to the present embodiment decreases the inter-vehicular distance in the switch driving characteristics. This enables the switch driving characteristics to be set with the intension of the driver being reflected therein. Note that, if an occupant of the vehicle adjusts and decreases the inter-vehicular distance during automated driving, the driving control method and apparatus according to the present embodiment may set the pre-adjustment inter-vehicular distance as the inter-vehicular distance in the switch driving characteristics. This enables a safe switch from automated driving to manual driving.

Further, if an occupant of the vehicle adjusts and increases the inter-vehicular distance to a preceding vehicle during automated driving, the driving control method and apparatus according to the present embodiment increases the inter-vehicular distance in the switch driving characteristics. This enables the switch driving characteristics to be set with the intension of the driver being reflected therein. Note that, if an occupant of the vehicle adjusts and increases the inter-vehicular distance during automated driving, the driving control method and apparatus according to the present embodiment may set the post-adjustment inter-vehicular distance as the inter-vehicular distance in the switch driving characteristics. This enables the switch driving characteristics to be set with the intension of the driver being reflected therein.

Further, the driving control method and apparatus according to the present embodiment presets a switch requirement for permitting a switch from automated driving to manual driving, and makes a switch to manual driving when the switch requirement is satisfied. This enables a switch to manual driving to be made when the switch requirement is satisfied, i.e., when it is safe, and thus allows the driver to start manual driving feeling secure.

Further, the driving control method and apparatus according to the present embodiment sets at least one of the following requirements as a switch requirement: the vehicle travels straight, the steering angle of the vehicle is a predetermined value or below, the vehicle travels at a constant speed, and the acceleration or deceleration of the vehicle is a predetermined value or below. Also, the driving control method and apparatus according to the present embodiment sets at least one of the following requirements as a switch requirement: no travelling or parked vehicle is located within a predetermined range of the vehicle and a distance from the vehicle to an intersection, a curve, a mergence point, a branch point, a point where the number of lanes decreases, a point where the lane width decreases, or a point where the speed limit changes is a predetermined value or above. This enables a switch to manual driving to be made with the vehicle being safe, and therefore allows the driver to start manual driving feeling secure.

Further, the driving control method and apparatus according to the present embodiment adjusts switch driving characteristics to satisfy a switch requirement. This enables the switch requirement to be satisfied speedily according to the surrounding situation of the vehicle, and therefore enables a smooth switch to manual driving.

Further, if a switch requirement is not satisfied, the driving control method and apparatus according to the present embodiment makes a switch to manual driving when the travel condition of the vehicle does not change for a predetermined period of time. This can prevent a delay in a switch to manual driving.

Further, the driving control method and apparatus according to the present embodiment adjusts the switch driving characteristics according to at least one of the attribute of an occupant or a loading situation of the vehicle. This enables an even safer switch from automated driving to manual driving according to the situation of the vehicle.

Further, before changing driving characteristics for automated driving to switch driving characteristics, the driving control method and apparatus according to the present embodiment confirms with an occupant of the vehicle whether to permit changing the driving characteristics, and changes the driving characteristics for automated driving to switch driving characteristics if the changing the driving characteristics is permitted. This enables the driving characteristics to be changed according to the intention of the occupant, and therefore can reduce a feeling of awkwardness that the driver may experience due to the changing of driving characteristics.

Second Embodiment

A second embodiment to which the present invention is applied is described below with reference to a drawing. In the first embodiment described above, both an automated driving section and a switch section are preset once a travel route is set as a result of a destination being inputted. Driving switch processing of the present embodiment is different from the first embodiment in presetting only an automated driving section, but not a switch section. Thus, compared to the driving switch processing in FIG. 4, the driving switch processing of the present embodiment illustrated in FIG. 8 does not have the processing in Step S105 for setting a switch section and has processing in Step S219 in place of the processing in Step S119 in FIG. 4. Note that the configuration of the driving control system and processing other than Step S219 are the same as those in the first embodiment, and are not described in detail here. Note that the switch section setter 27 does not operate because a switch section is not set.

Figure 8:
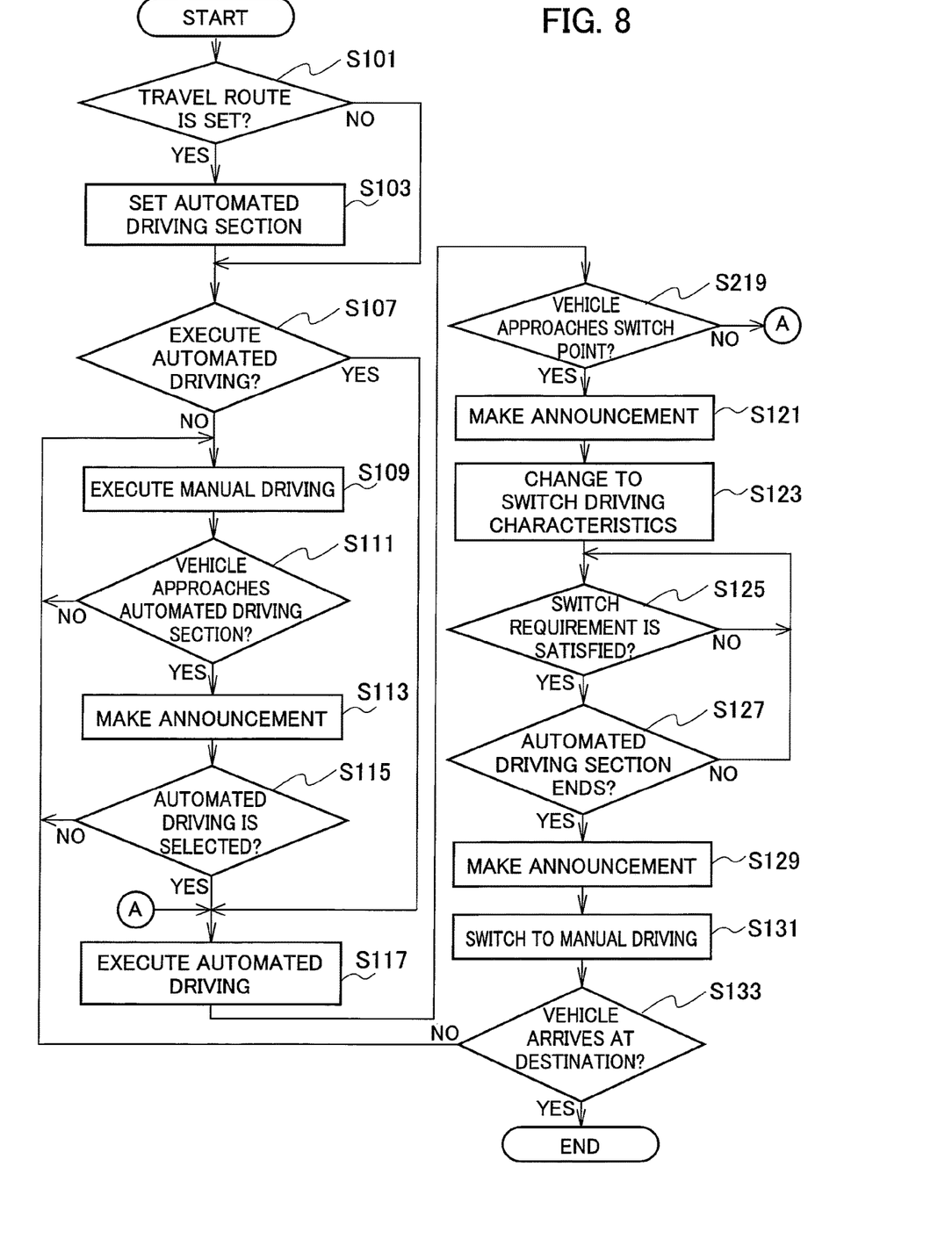
FIG. 8 is a flowchart illustrating a processing procedure of driving switch processing performed by a driving control apparatus according to a second embodiment of the present invention.

The following describes processing in Step S219 not performed in the first embodiment. In Step S219, the automated driving executor 31 determines whether the vehicle has traveled and approached a switch point where a switch is made from automated driving to manual driving. The determination may be made based on whether the distance to the switch point is 1 km or shorter or whether the time it takes to get to the switch point is 30 seconds or less. Then, the automated driving executor 31 proceeds back to Step S117 and continues automated driving when determining that the vehicle has not approached the switch point, or proceeds to Step S121 when determining that the vehicle has approached the switch point.

Advantageous Effects of the Second Embodiment

As described in detail above, the driving control method and apparatus according to the present embodiment does not preset a switch section, and therefore can simplify the driving switch processing and reduce processing loads.

Third Embodiment

A third embodiment to which the present invention is applied is described below with reference to a drawing. In the present embodiment, a description is given of a case where the driver operates the driving switching switch 7 to make a switch from automated driving to manual driving, instead of an automated driving section and a switch section being preset as described in the first embodiment. Note that the configuration of the driving control system according to the present embodiment is the same as that in the first embodiment, and is not described in detail here. Note that the automated driving section setter 23 and the switch section setter 27 do not operate because an automated driving section and a switch section are not set.

Procedure of the Driving Switch Processing

Figure 9:
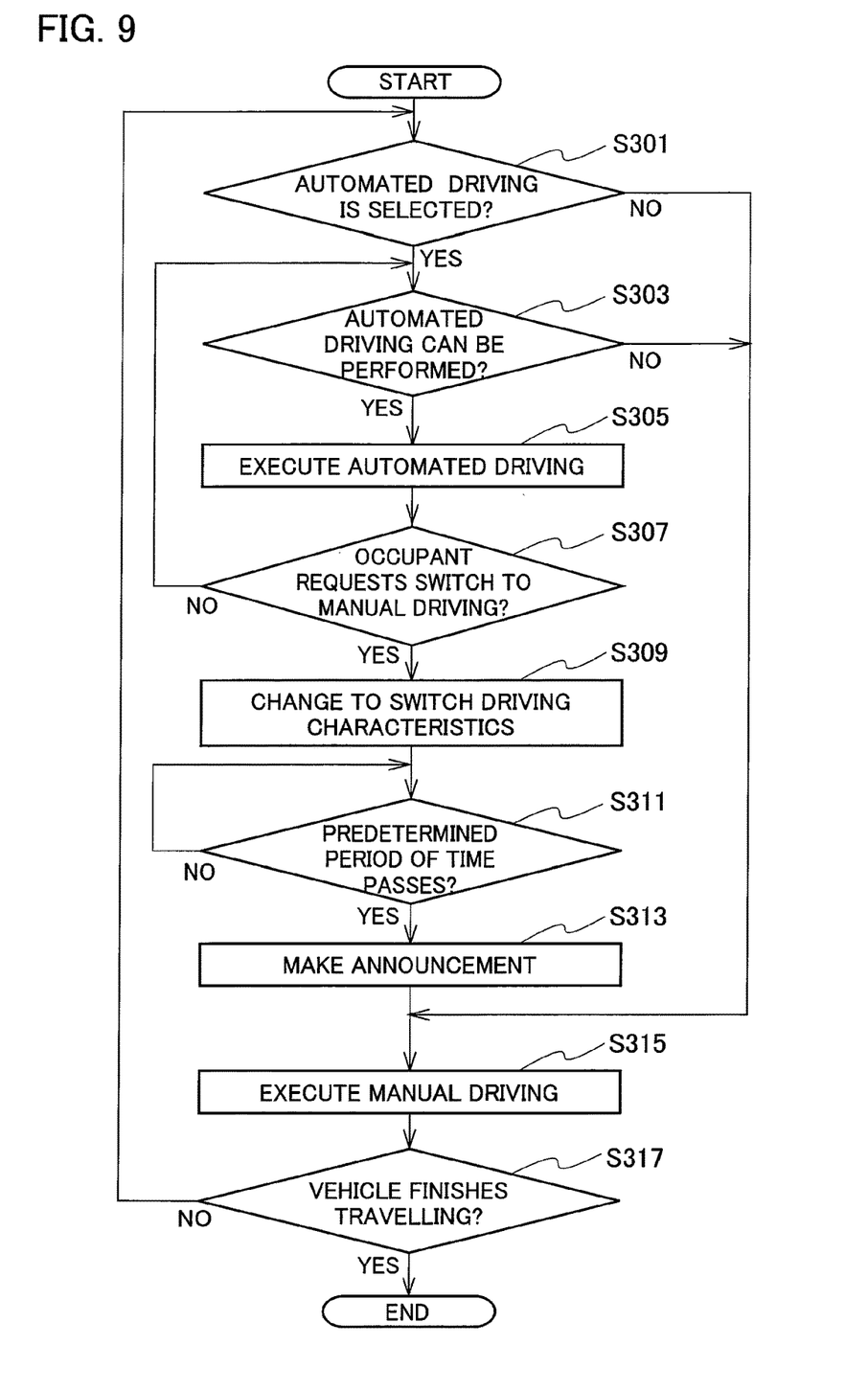
FIG. 9 is a flowchart illustrating a processing procedure of driving switch processing performed by a driving control apparatus according to a third embodiment of the present invention.

Next, the procedure of the driving switch processing performed by the driving control apparatus 1 according to the present embodiment is described with reference to the flowchart in FIG. 9. The driving switch processing illustrated in FIG. 9 is initiated when the ignition of the vehicle is turned on.

In Step S301, the automated driving executor 31 determines whether the driver has operated the driving switching switch 7 to select automated driving. The automated driving executor 31 proceeds to Step S303 when the driver has selected automated driving, or proceeds to Step S315 when the driver has not selected automated driving.

In Step S303, the automated driving executor 31 determines whether automated driving can be performed. The automated driving executor 31 determines whether automated driving can be performed on a road the vehicle is currently travelling, based on data on the travel condition detected by the travel condition detector 3 and the surrounding situation detected by the surrounding situation detector 5. For example, it is determined based on map information and camera information that automated driving can be performed, when the road the vehicle is currently travelling is an arterial road, an expressway, or a road with one or more lanes in one direction. It is determined that automated driving can be performed also when the road has a detectable white line and is a road where automated driving has been performed before. Then, the automated driving executor 31 proceeds to Step S305 when determining that automated driving can be performed, or proceeds to Step S315 when determining that automated driving cannot be performed.

In Step S305, the automated driving executor 31 executes automated driving. Specifically, the automated driving executor 31 executes automated driving using the driving characteristics set by the automated driving characteristics setter 25.

In Step S307, the automated driving executor 31 determines whether the driver has requested a switch to manual driving. For example, the automated driving executor 31 determines that the driver has requested a switch to manual driving when the driver operates the driving switching switch 7 to select manual driving or when it is detected that the driver has intervened in automated driving. The driver makes such a request when the driver decides that it is better to perform manual driving because there is a construction site, an intersection, or the like. The automated driving executor 31 proceeds to Step S309 when there has been a request for a switch to manual driving, or proceeds back to Step S303 and continues automated driving when there is no such a request for a switch.

In Step S309, the automated driving executor 31 changes the driving characteristics for automated driving to switch driving characteristics set by the switch driving characteristics setter 29. Even if the driver operates the driving switching switch 7 to select manual driving, it does not mean that manual driving can be started right away. Thus, automated driving is continued for a predetermined period of time using the switch driving characteristics.

In Step S311, the automated driving executor 31 determines whether the predetermined period of time has passed. The automated driving executor 31 continues automated driving using the switch driving characteristics when the predetermined period of time has not passed yet, or proceeds to Step S313 when the predetermined period of time has passed.

In Step S313, the automated driving executor 31 makes an announcement informing an occupant of the vehicle that automated driving is ending. For example, the automated driving executor 31 makes an announcement, "Automated driving is ending. Please start manual driving," to inform the driver that automated driving ends and manual driving starts.

In Step S315, the automated driving executor 31 executes manual driving. The automated driving executor 31 ends automated driving and makes a switch to manual driving if Step S315 is performed after Step S313, or continues manual driving if Step S315 is performed after Step 301 or 303.

In Step S317, the automated driving executor 31 determines whether the ignition is turned off and the vehicle finishes travelling. The automated driving executor 31 proceeds back to Step S301 and continues manual driving if the vehicle does not finish travelling, or ends the driving switch processing according to the present embodiment if the vehicle finishes travelling.

Advantageous Effects of the Third Embodiment

As described above in detail, when making a switch from automated driving to manual driving in response to a switch request from the driver of the vehicle, the driving control method and apparatus according to the present embodiment makes the switch to manual driving after changing the driving characteristics for automated driving to switch driving characteristics. This allows the driver to start manual driving feeling secure after a switch is made from automated driving to manual driving.

Note that the above embodiments are examples of the present invention. Thus, it goes without saying that the present invention is not limited to the above embodiments, and in addition to the embodiments, can be variously modified according to designs and the like without departing from the technical concept according to the present invention.

REFERENCE SIGNS LIST

1 driving control apparatus
3 travel condition detector
5 surrounding situation detector
7 driving switching switch
9 driving characteristics adjustor
11 display
13 control status display module
15 actuator control module
17 actuator
21 information acquirer
23 automated driving section setter
25 automated driving characteristics setter
27 switch section setter
29 switch driving characteristics setter
31 automated driving executor
50 vehicle
51 CAN
53 navigation device 55 camera
57 laser radar
59 communication device
61 server
100 driving control system

The invention claimed is:

1. A driving control method performed by a driving control apparatus in a vehicle capable of switching between manual driving in which the vehicle is caused to travel by a driving operation performed by an occupant and automated driving in which the vehicle is caused to travel without the driving operation performed by the occupant, the method comprising:
when making a switch from the automated driving to the manual driving, making the switch to the manual driving after changing driving characteristics for the automated driving to switch driving characteristics suitable for the switch to the manual driving; and
if the occupant adjusts and increases an inter-vehicular distance to a preceding vehicle longer than a distance set during the automated driving, setting the switch driving characteristics so that the inter-vehicular distance stay at a post-adjustment inter-vehicular distance;
wherein a distance from the vehicle to the preceding vehicle in the switch driving characteristics is set to be longer than the distance set during the automated driving.

2. The driving control method according to claim 1, comprising
setting, on a travel route of the vehicle, a switch section where the driving characteristics for the automated driving are changed to the switch driving characteristics; and
making the switch to the manual driving after the switch section.

3. The driving control method according to claim 2, further comprising:
setting, on the travel route of the vehicle, the switch section where the driving characteristics for the automated driving are changed to the switch driving characteristics; and
for a predetermined period of time before the switch section starts, prohibiting adjustment made on the driving characteristics for the automated driving by the occupant of the vehicle.

4. The driving control method according to claim 2, wherein
the switch section is set to a section suitable for switching from the automated driving to the manual driving.

5. The driving control method according to claim 1, comprising
if the occupant of the vehicle adjusts the driving characteristics during the automated driving, adjusting the switch driving characteristics according to the adjustment made on the driving characteristics.

6. The driving control method according to claim 5, wherein
if the occupant of the vehicle adjusts and increases a vehicle speed of the vehicle during the automated driving, the vehicle speed in the switch driving characteristics is increased.

7. The driving control method according to claim 5, wherein
if the occupant of the vehicle adjusts and decreases a vehicle speed of the vehicle during the automated driving, the vehicle speed in the switch driving characteristics is decreased.

8. The driving control method according to claim 5, wherein
if the occupant of the vehicle adjusts and decreases the inter-vehicular distance to the preceding vehicle during the automated driving, the inter-vehicular distance in the switch driving characteristics is decreased.

9. The driving control method according to claim 5, wherein
if the occupant of the vehicle adjusts and increases the inter-vehicular distance to the preceding vehicle during the automated driving, the inter-vehicular distance in the switch driving characteristics is increased.

10. The driving control method according to claim 1, wherein
a vehicle speed of the vehicle in the switch driving characteristics is set to be lower than the vehicle speed during the automated driving.

11. The driving control method according to claim 10, wherein
the vehicle speed of the vehicle in the switch driving characteristics is set to be lower than the vehicle speed during the automated driving by a predetermined value or more.

12. The driving control method according to claim 10, wherein
the vehicle speed of the vehicle in the switch driving characteristics is decreased at a deceleration of a predetermined value or above.

13. The driving control method according to claim 1, wherein
the distance from the vehicle to the preceding vehicle in the switch driving characteristics is set to be longer than the distance set during the automated driving by a predetermined value or more.

14. The driving control method according to claim 13, wherein
in the switch driving characteristics, the distance from the vehicle to the preceding vehicle is increased at a change rate of a predetermined value or above.

15. The driving control method according to claim 1, comprising:
presetting a switch requirement for permitting the switch from the automated driving to the manual driving; and
making the switch to the manual driving when the switch requirement is satisfied.

16. The driving control method according to claim 15, wherein
the switch requirement is at least one of the following requirements where: the vehicle travels straight; a steering angle of the vehicle is a predetermined value or below; the vehicle travels at a constant speed; an acceleration or deceleration of the vehicle is a predetermined value or below: no travelling or parked vehicle is located within a predetermined range from the vehicle; and a distance from the vehicle to an intersection, a curve, a mergence point, a branch point, a point where the number of lanes decreases, a point where a lane width decreases, or a point where a speed limit changes is a predetermined value or above.

17. The driving control method according to claim 15, wherein the switch driving characteristics are adjusted to satisfy the switch requirement.

18. The driving control method according to claim 15, wherein if the switch requirement is not satisfied, a switch to the manual driving is made when there is no change in a travel condition of the vehicle for a predetermined period of time.

19. The driving control method according to claim 1, wherein the switch driving characteristics are adjusted according to at least one of an attribute of the occupant of the vehicle and a loading situation of the vehicle.

20. The driving control method according to claim 1, comprising:

before changing the driving characteristics for the automated driving to the switch driving characteristics, confirming with the occupant of the vehicle whether to permit changing the driving characteristics; and changing the driving characteristics for the automated driving to the switch driving characteristics if the changing the driving characteristics is permitted.

21. A driving control apparatus that makes a switch between automated driving and manual driving in a vehicle capable of switching between the manual driving and the automated driving, wherein when making a switch from the automated driving to the manual driving, the driving control apparatus makes the switch to the manual driving after changing driving characteristics for the automated driving to switch driving characteristics suitable for the switch to the manual driving; and if the occupant adjusts and increases an inter-vehicular distance to a preceding vehicle longer than a distance set during the automated driving, set the switch driving characteristics so that the inter-vehicular distance stay at a post-adjustment inter-vehicular distance;

wherein a distance from the vehicle to the preceding vehicle in the switch driving characteristics is set to be longer than the distance set during the automated driving.

\* \* \* \* \*